(12) United States Patent
Lloyd (10) Patent No.: US 8,283,018 B2
(45) Date of Patent: Oct. 9, 2012

(54) COMPOSITE STRUCTURE

(75) Inventor: James Lloyd, Bristol (GB)

(73) Assignee: Airbus Operations Limited, Bristol (GB)

( * ) Notice: Subject to any disclaimer, the term of this patent is extended or adjusted under 35 U.S.C. 154(b) by 223 days.

(21) Appl. No.: 12/513,402

(22) PCT Filed: Nov. 26, 2007

(86) PCT No.: PCT/GB2007/050712
§ 371 (c)(1),
(2), (4) Date: May 4, 2009

(87) PCT Pub. No.: WO2008/068523
PCT Pub. Date: Jun. 12, 2008

(65) Prior Publication Data
US 2010/0068450 A1 Mar. 18, 2010

(30) Foreign Application Priority Data
Dec. 4, 2006 (GB) .................................. 0624208.5

(51) Int. Cl.
| | |
|---|---|
| *B32B 3/06* | (2006.01) |
| *B32B 3/00* | (2006.01) |
| *B64C 1/00* | (2006.01) |
| *B64C 30/00* | (2006.01) |
| *B64C 3/00* | (2006.01) |
| *B64C 5/00* | (2006.01) |
| *B64C 1/06* | (2006.01) |
| *B64C 1/12* | (2006.01) |
| *B29C 65/00* | (2006.01) |

(52) U.S. Cl. ........ 428/99; 428/156; 428/172; 244/117 R; 244/121; 244/123.1; 244/131; 244/132; 244/133; 156/60

(58) Field of Classification Search ................ 428/99, 428/172; 244/123, 117, 119, 219, 132, 124, 244/133, 131, 133.35
See application file for complete search history.

(56) References Cited

U.S. PATENT DOCUMENTS

| | | | | |
|---|---|---|---|---|
| 5,242,523 | A * | 9/1993 | Willden et al. ............... | 156/285 |
| 5,735,486 | A | 4/1998 | Piening et al. | |
| 6,405,978 | B1 | 6/2002 | Dean et al. | |
| 6,502,788 | B2 * | 1/2003 | Noda et al. ................. | 244/123.3 |
| 6,613,258 | B1 * | 9/2003 | Maison et al. ............... | 264/102 |
| 6,702,911 | B2 * | 3/2004 | Toi et al. ....................... | 156/93 |
| 2003/0080251 | A1 * | 5/2003 | Anast ............................ | 244/119 |
| 2005/0112394 | A1 * | 5/2005 | Pham et al. ................... | 428/544 |
| 2006/0226287 | A1 * | 10/2006 | Grantham et al. ............ | 244/119 |

FOREIGN PATENT DOCUMENTS

JP 2002302097 10/2002
(Continued)

OTHER PUBLICATIONS

ISR for PCT/GB2007/050712 dated Mar. 20, 2008.
British Search Report for GB0624208.5 dated Mar. 27, 2007.

*Primary Examiner* — David Sample
*Assistant Examiner* — Nathan Van Sell
(74) *Attorney, Agent, or Firm* — Lowe, Hauptman, Ham & Berner, LLP (57) ABSTRACT

A composite structure comprising: a panel formed from two or more plies of composite material, the panel having a surface formed with a step where the thickness of the panel changes. Two or more stiffeners are attached to the surface of the panel. One of the stiffeners engages at least part of the step so as to transmit load forces in the panel.

16 Claims, 7 Drawing Sheets

FOREIGN PATENT DOCUMENTS

| | | |
|---|---|---|
| WO | 99/39976 A1 | 8/1999 |
| WO | 00/45001 A1 | 8/2000 |
| WO | 03/022678 A1 | 3/2003 |
| WO | 2004/039670 A2 | 5/2004 |

* cited by examiner

COMPOSITE STRUCTURE

RELATED APPLICATIONS

The present application is based on International Application Number PCT/GB2007/050712 filed Nov. 26, 2007, and claims priority from British Application Number 0624208.5 filed Dec. 4, 2006, the disclosures of which are hereby incorporated by reference herein in their entirety.

FIELD OF THE INVENTION

The present invention relates to a composite structure, a method of manufacturing a composite structure, and a method of transmitting load in a composite structure. The structure may be, for example, an aircraft skin, but is not limited to such an application.

BACKGROUND OF THE INVENTION

Figure 1:
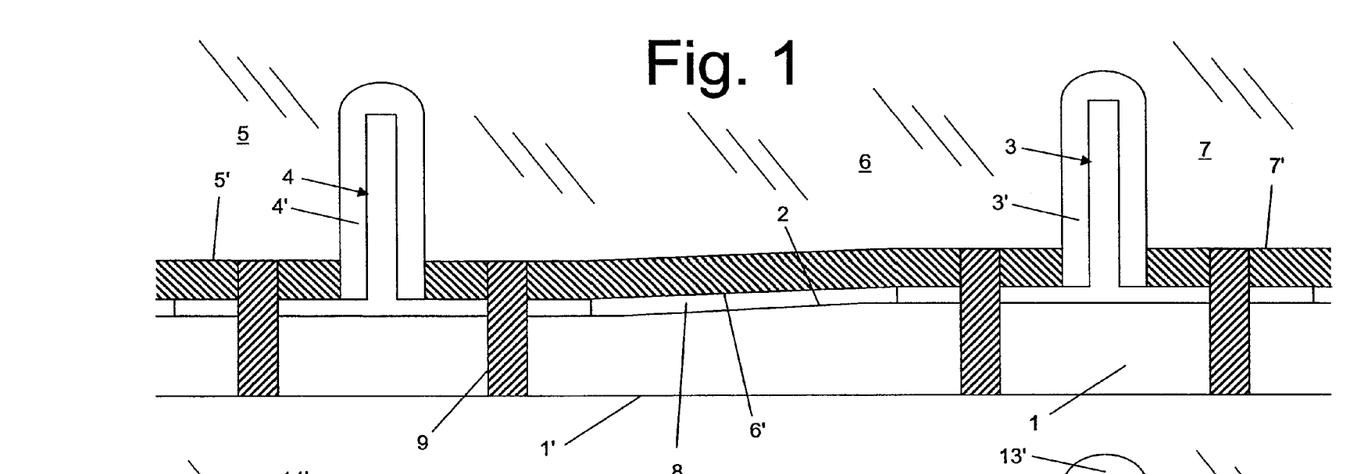
FIG. 1 is a schematic cross-section through a composite aircraft skin structure.

The composite aircraft skin structure shown in FIG. 1 comprises a panel 1 with an inner mould line surface (IML) formed with a ramp 2, and an outer mould line surface (OML) 1' which forms an outer aerodynamic surface of an aircraft. A pair of stringers 3, 4 are attached to the IML, and run spanwise along the length of the panel, stiffening the panel against bending in the spanwise direction.

The skin is joined to a rib via three rib feet 5-7, separated by a pair of "mouse hole" slots 3',4' which provide clearance for the stringer blades. Each rib foot 5-7 has a respective flange 5'-7' extending at right angles to the web of the rib foot. The skin is joined to the rib by passing fasteners 9 through the stringer feet, the panel and the rib foot flanges.

A problem with the structure shown in FIG. 1 is that the ramp 2 must be relatively shallow (typically with a gradient no greater than 1:20 relative to the OML) to avoid load eccentricities. Also, it is preferable for the IML to be parallel to the OML under the stringer feet (because this makes it easier to mount the rib feet onto the stringer feet) and as a result it is preferred for the ramp not to extend under the stringer feet. Consequently it is difficult to achieve a significant variation in panel thickness between the two stringers. Such a large variation in thickness may be desirable for example in the region of an engine or pylon mount, where a thicker skin is required.

SUMMARY OF THE INVENTION

The present invention provides a composite structure comprising:
 a panel formed from two or more plies of composite material, the panel having a surface formed with a step where the thickness of the panel changes; and
 two or more stiffeners attached to the surface of the panel;
wherein one of the stiffeners engages at least part of the step.

The invention also provides a method of manufacturing a composite structure comprising forming a panel with a step; attaching the stiffeners to the surface of the panel; and engaging at least part of the step with one of the stiffeners.

The invention also provides a method of transmitting load in the composite structure, the method comprising transmitting load between the step and the stiffener which engages at least part of the step.

The composite structure may be a part of an aircraft such as a wing or fuselage skin, or may be any stiffened composite structure which requires an abrupt change in panel thickness.

Various preferred features of the invention are set out in the dependent claims.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
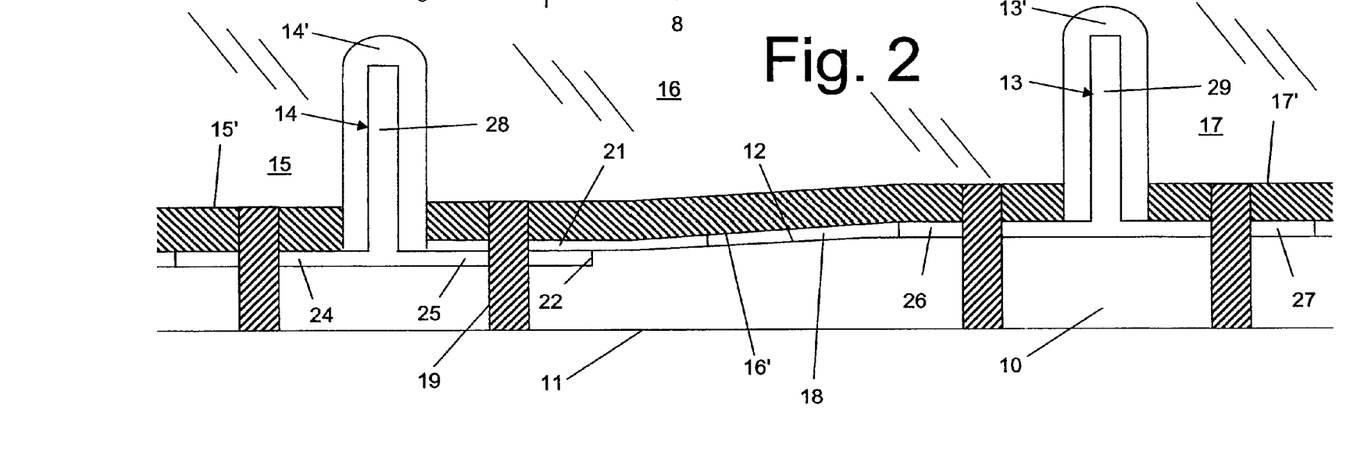
FIG. 2 is a schematic cross-section through a composite aircraft skin structure according to a first embodiment of the invention.

The composite aircraft skin structure shown in FIG. 2 comprises a panel 10 formed from a stack of plies of composite material. The panel 10 has an inner mould line surface (IML) formed with a step 22 and a ramp 12, and an outer mould line surface (OML) 11 which forms an outer aerodynamic surface of an aircraft. The OML 11 is shown with a flat cross-section in the chordwise direction, although it will be formed with a slight curve in both the spanwise and chordwise directions as required to give the desired aerodynamic characteristics. Since there is no step in the OML 11, the thickness of the panel 10 changes abruptly at the step 22 in the IML.

Figure 3:
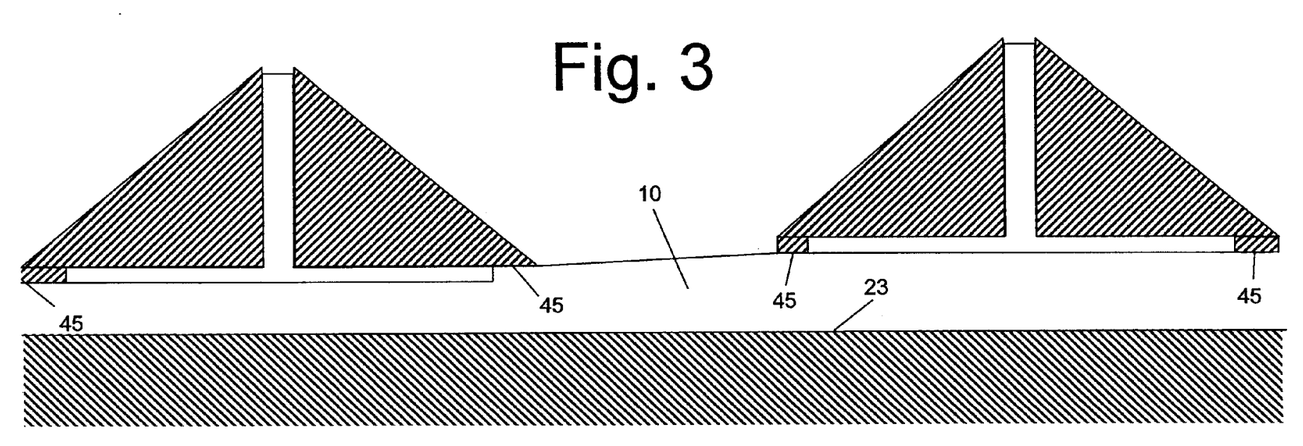
FIG. 3 shows the stringers and mandrels being placed onto the panel.

The panel 10 is formed by laying a stack of plies of "prepreg" (undirectional layers of carbon fibres, pre-impregnated with uncured epoxy resin) on an OML tool 23 shown in FIG. 3. The OML tool 23 is shaped to give the desired profile to the OML. The panel is then "bagged" by placing bagging layers on the panel (namely a peel ply, release film, breather layer and vacuum bag) and sealing the edges of the vacuum bag to the OML tool 23. After bagging, the panel is cured in a first cure cycle by heating the panel up to cure temperature in an autoclave, and evacuating the space between the vacuum bag and the panel (along with increasing pressure in the autoclave) to apply consolidation pressure to the panel.

To ensure that the face of the step 22 is smooth and at a desired angle, an intensifier plate (not shown) may apply additional pressure to the face of the step 22 during cure in order to control its geometry. Alternatively, after cure, the step 22 may be machined with a router.

Figure 4:
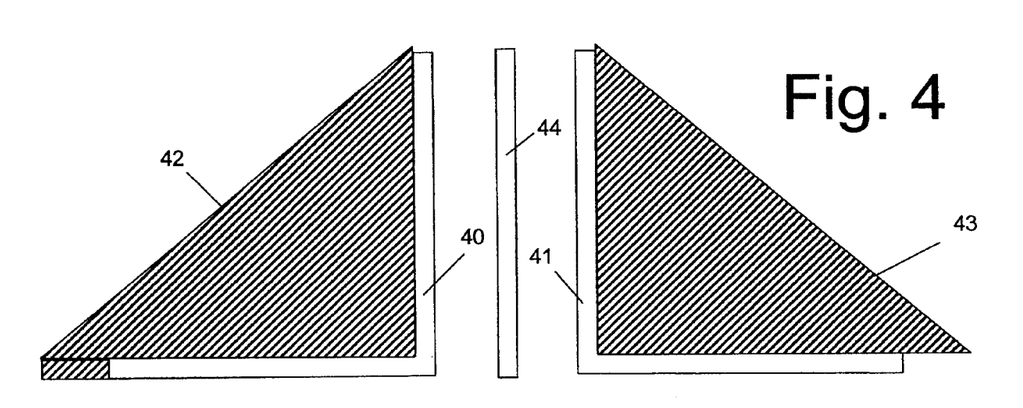
FIG. 4 shows a method of forming one of the stringers.

A first stringer 13 is then attached to the IML on the thicker side of the step 22, and a second stringer 14 is attached to the IML on the thinner side of the step 22. The stringers 13,14 run spanwise along the length of the panel, stiffening the panel against bending in the spanwise direction. Each stringer 13,14 is formed by a similar process, and a method of forming and attaching one of the stringers 13 is shown in detail in FIGS. 3 and 4. In a first step shown in FIG. 4, a of pair L-section preforms 40,41 are formed by laying a stack of plies of prepreg on a pair of mandrels 42,43, each ply of prepreg being bent round a corner of the mandrel. In a second step shown in FIG. 3, the pair of L-section preforms 40,41 are placed back to back on the cured panel 10, optionally with a prepreg filler layer 44 between the blade portion of each preform. Although the outside edge at the corner of each preform 40,41 is shown schematically in FIG. 4 as a sharp edge, there will in practice be a radius leaving a gap which is filled with a filler material (not shown) before the mandrels are placed on the panel. Suitable filler materials include a spanwise length of CFRP prepreg rolled up and moulded to shape (commonly called a "noodle") or some form of structural adhesive. Each mandrel has a landing region 45 which extends beyond the stringer foot and engages the panel 10 so as to support the weight of the mandrel. The stringers 13,14 are then cured in a second curing cycle similar to the first curing cycle described above.

Referring back to FIG. 2: each stringer comprises a pair of feet 24-27 which are attached to the IML of the panel 10, and a stiffening portion 28,29 (conventionally referred to as a "blade") which extends away from the panel at an angle to the feet into a respective "mouse hole" slot 13',14' between the rib feet. Each foot extends from the blade to a toe remote from the blade. The interface between the toe 30 of the foot 25 and the step 22 is shown in detail in FIG. 5a.

Figure 5A:
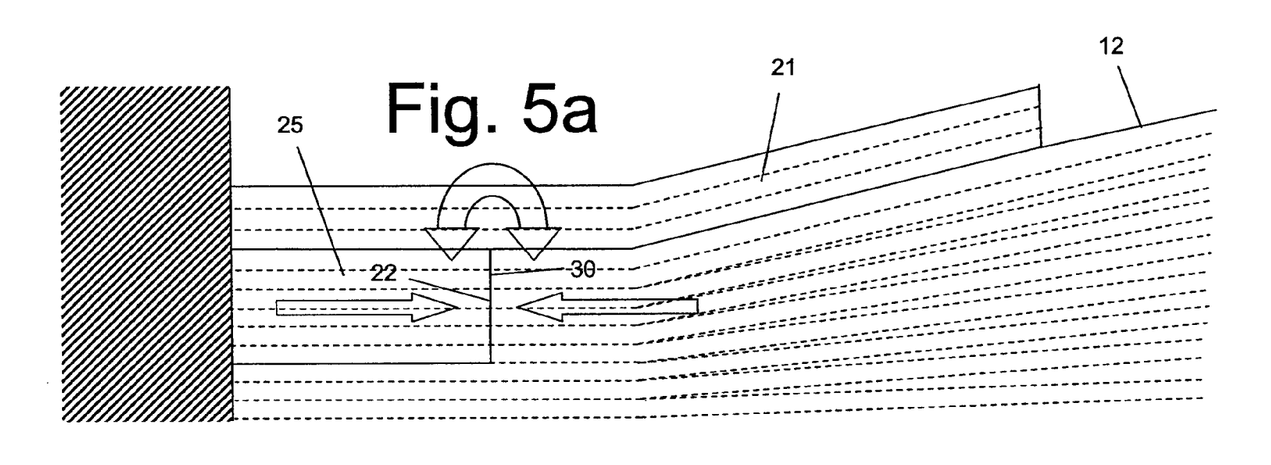
FIG. 5a shows part of the structure of FIG. 2 in detail.

FIG. 5a shows the individual plies of prepreg in dashed lines. As various ply ramping techniques are possible, the dashed lines of the ramp 12 region are representative. The forming of the ramp will be explained later. As can be seen in FIG. 5a, the step 22 is a so-called "cliff edge" formed by the edges of discontinued plies in the panel 10. Preferably there are more than two discontinued plies, and in the example shown in FIG. 5a there are six discontinued plies (although more or fewer plies may be discontinued to form a step of the desired height). The toe 30 of the stringer foot 25 is also formed by the edges of six discontinued plies, which engage the face of the step 22 as shown in FIG. 5a.

After the stringers have been cured, the mandrels are removed and a cap 21 is laid onto the IML, bridging the panel 10 on the upper side of the step and the foot 25 of the second stringer 14 on the lower side of the step. The cap 21 is formed from one or more plies of composite material such as glass-fibre reinforced epoxy resin (GFRP) or carbon-fibre reinforced epoxy resin (CFRP). In the example shown in FIG. 5a the cap 21 is formed by three plies, but more or fewer plies may be laid to form a cap of the desired thickness. The cap 21 is then cured in a third curing cycle. Alternatively, the cap 21 may be manufactured as part of the preform 40 shown in FIG. 4. In this case only two curing cycles are necessary, but more complex tooling would be required.

In order to ensure an intimate engagement between the stringer foot 25 and the step 22, the discontinued plies forming the toe 30 of the stringer foot may optionally be cut (for instance with a blade, sonic knife or water jet) to provide a smooth face at a desired angle. Alternatively, an intensifier plate (not shown) may apply additional pressure in the region of the toe 30 during the second cure cycle in order to form the toe with a desired geometry. As a result of the engagement between the toe 30 and the step 22, compressive load forces (shown by straight block arrows in FIG. 5a) are transmitted directly between the toe 30 and the step 22. Tensile load forces (shown by a curved block arrow in FIG. 5a) are transmitted between the panel and the stringer foot 25 via the cap 21. Thus the cap 21 ensures that the interface between the toe 30 and the step 22 does not open up when the panel is subjected to a bending moment that puts the IML into tension.

A ramp 12 is formed in the IML of the panel between the stringers. The ramp is formed by discontinuing selected plies (for instance every other ply) in the interior of the panel, the remaining plies shown in FIG. 5a converging to form the ramp. The discontinued internal plies are not shown in FIG. 5a. The surface of the ramp 12 thus has a relatively smooth profile since it is formed by a continuous surface ply.

Figure 5B:
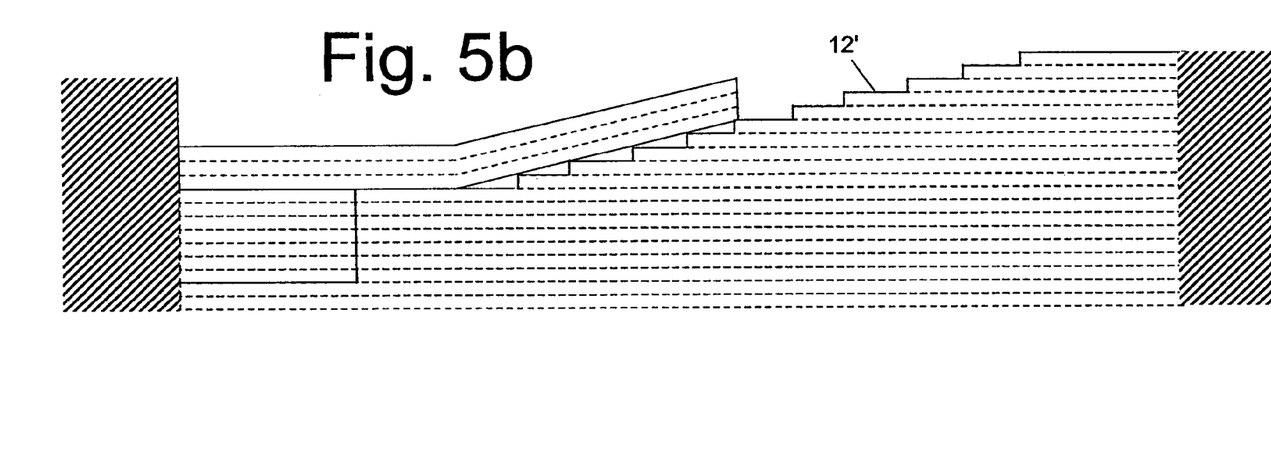
FIG. 5b shows a variant of the ramp.

An alternative ramp structure is shown in FIG. 5b. In this case the ramp is formed by discontinuing a number of surface plies of the panel to form a ramp 12' with a stepped profile.

Figure 5C:
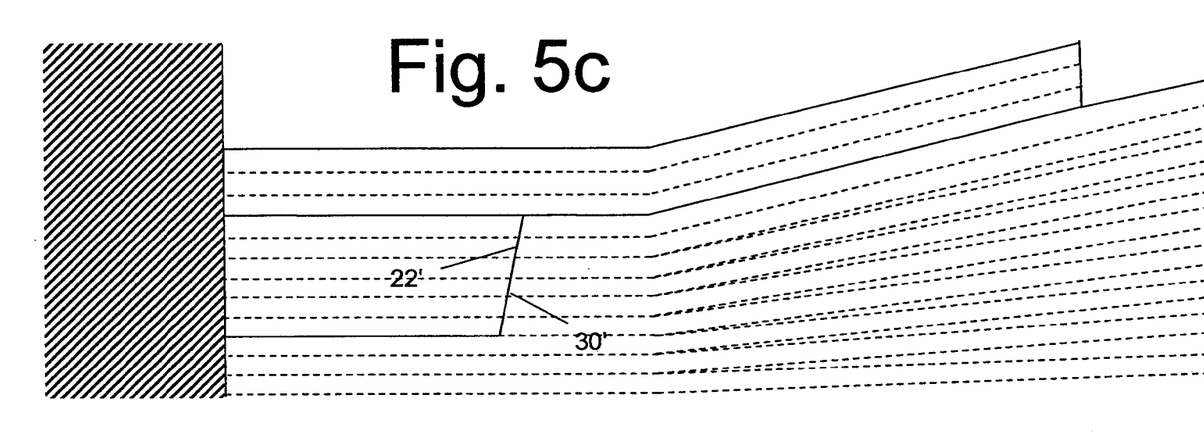
FIG. 5c shows a variant with a non-perpendicular step in the panel.

An alternative interface between the stringer foot and the step in the panel is shown in FIG. 5c. In this case the ramp 22' and the toe 30' of the stringer foot are cut at an angle.

Figure 5D:
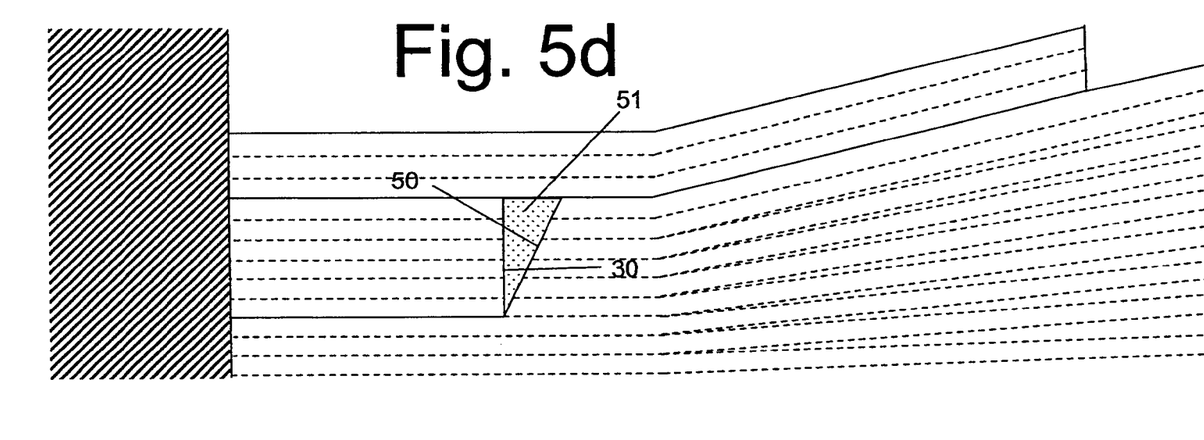
FIG. 5d shows a variant with a filler.

A further alternative interface between the stringer foot and the step in the panel is shown in FIG. 5d. In this case there is a gap between the edge 50 where the plies of the panel are discontinued and the toe 30. The gap is filled with a filler material 51 similar to that described earlier. The filler material 51 engages the stringer toe 30 and the edges of the plies of composite material forming the edge 50 in order to transmit compressive load forces.

The skin is then integrated into a wing box by joining it to a rib as shown in FIG. 2. The rib has three rib feet 15-17, separated by a pair of "mouse hole" slots 13',14' which provide clearance for the stringer blades. Each rib foot 15-17 has a respective flange 15'-17' extending at right angles to the web of the rib foot. The skin is joined to the rib by passing fasteners 19 through the stringer feet, the panel and the rib foot flanges as shown in FIG. 2.

A gap 18 is present between the rib flange 16 and the panel. This gap 18 may be desirable to allow the flow of fuel between fuel chambers on either side of the rib. Alternatively, if the gap 18 is not required then the rib foot 16 may be joggled down to fill the gap 18 and engage the panel, and a further fastener (not shown) may be fitted through the panel and the flange 16' of the rib foot at the mid-point between the stringers 13,14.

Figure 6:
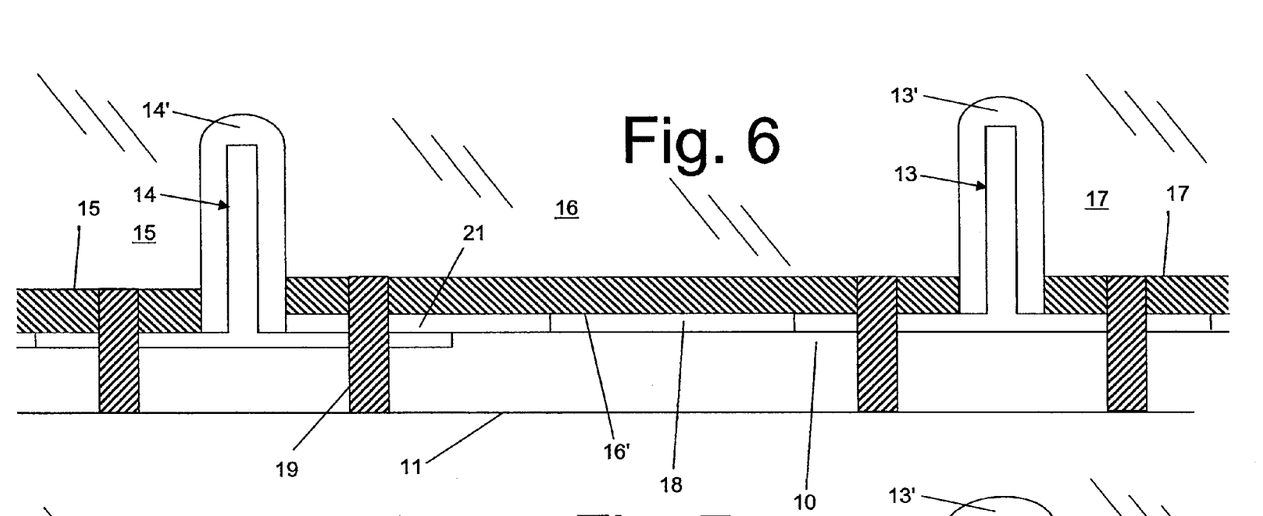
FIG. 6 is a schematic cross-section through a composite aircraft skin structure according to a second embodiment of the invention.

A second skin structure is shown in FIG. 6. The structure is similar to that of FIG. 2, and elements are given the same reference numeral as the corresponding elements in FIG. 2. Note that the structure of FIG. 6 omits the ramp 12 between the stringers.

Figure 7:
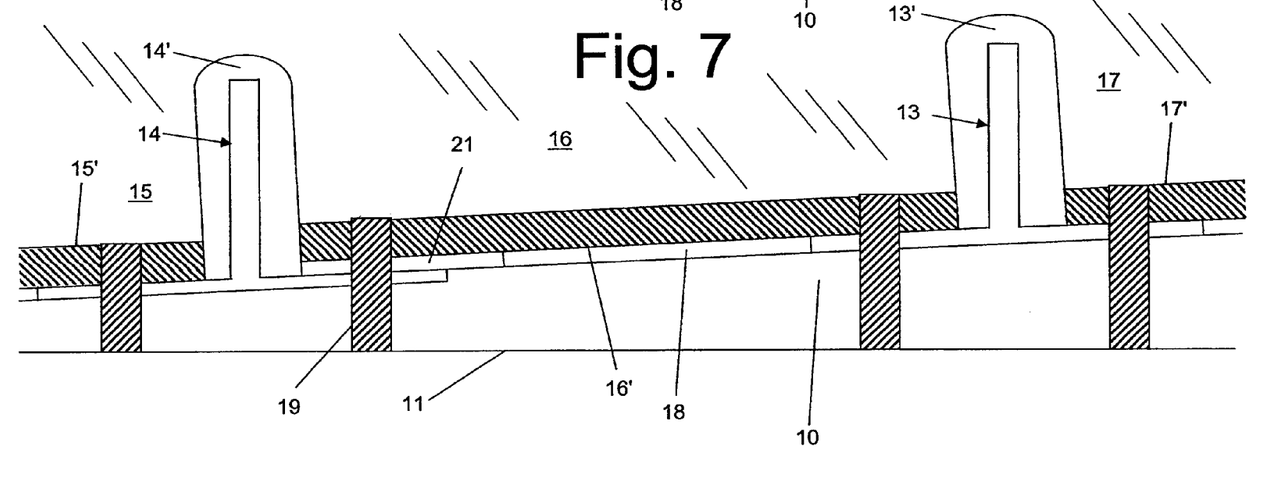
FIG. 7 is a schematic cross-section through a composite aircraft skin structure according to a third embodiment of the invention.

A third skin structure is shown in FIG. 7. The structure is similar to that of FIG. 2, and elements are given the same reference numeral as the corresponding elements in FIG. 2. In contrast to the discrete ramp 12 in FIG. 2, the structure of FIG. 7 has a continuous ramp formed in its IML, running under both stringers.

Figure 8:
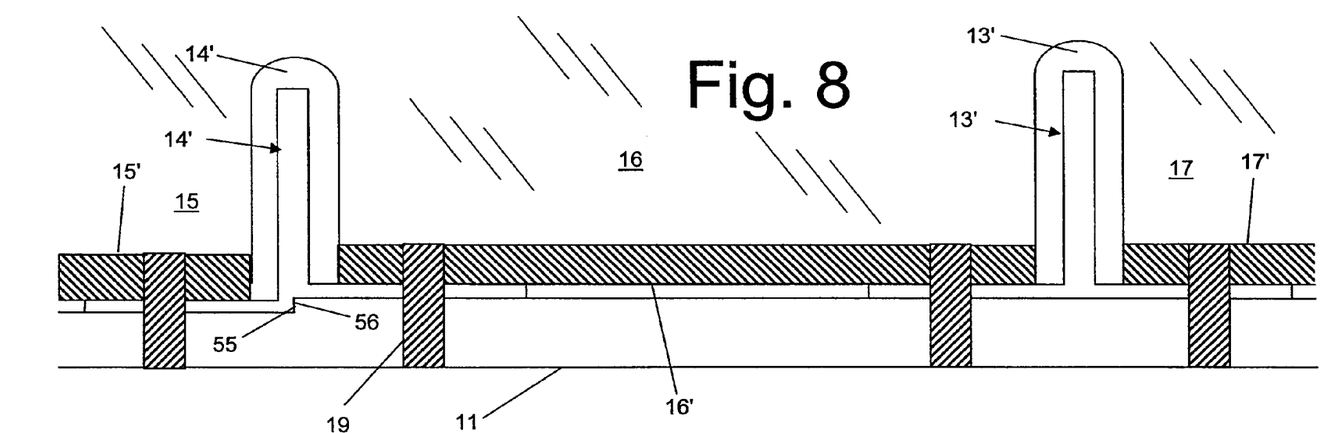
FIG. 8 is a schematic cross-section through a composite aircraft skin structure according to a fourth embodiment of the invention.

A fourth skin structure is shown in FIG. 8. The structure is similar to that of FIG. 2, and elements are given the same reference numeral as the corresponding elements in FIG. 2. Note that no ramp is shown in FIG. 8. Also, the stringer 14' is slightly different to the stringer 14 in FIG. 2. Specifically, the blade portion of the left-hand preform which forms the stringer 14' extends beyond the blade potion of the right-hand preform. As a result there is a step 56 in the base of the stringer 14' which engages the step 55 in the panel. Note that the stringer 14' straddles the step, in contrast to the stringer 14 which is attached to the panel on the thinner side of the step only.

Figure 9:
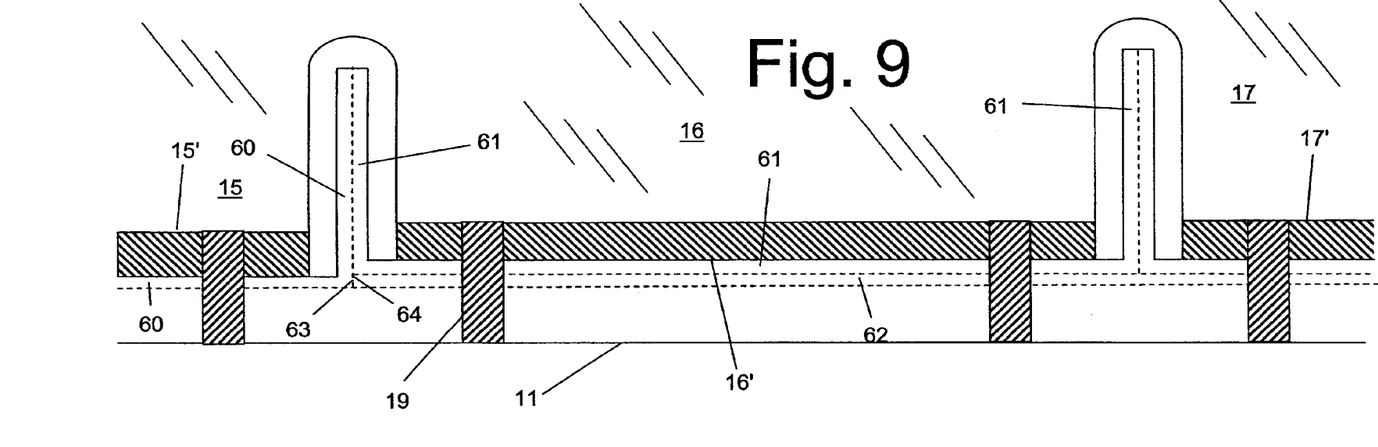
FIG. 9 is a schematic cross-section through a composite aircraft skin structure according to a fifth embodiment of the invention.

A fifth skin structure is shown in FIG. 9. The structure is similar to that of FIG. 2, and elements are given the same reference numeral as the corresponding elements in FIG. 2. Note that no ramp is shown in FIG. 9. Also, both stringers are formed in a different manner. The blade of the left-hand stringer is formed by a pair of layers 60, 61 (optionally separated by a prepreg filler layer which is not shown in FIG. 9). The layer 61 continues to the right-hand stringer, and thus forms the surface layer of the panel as well as the left-hand part of the blade of the right-hand stringer. The next layer 62 of the panel terminates to form a step 63. The step 63 engages the layer 60 at the step 64 where the base of the blade portion of the layer 60 extends beyond the base of the blade portion of the layer 61. The layer 60 continues to the left to form the right-hand part of the blade of the next stringer (not shown). The layers 60,61,62 may be formed from only one ply but in most cases will be formed by two or more plies of prepreg. Note that the left-hand stringer straddles the step, in a similar manner to the stringer 14' in FIG. 8.

Figure 10:
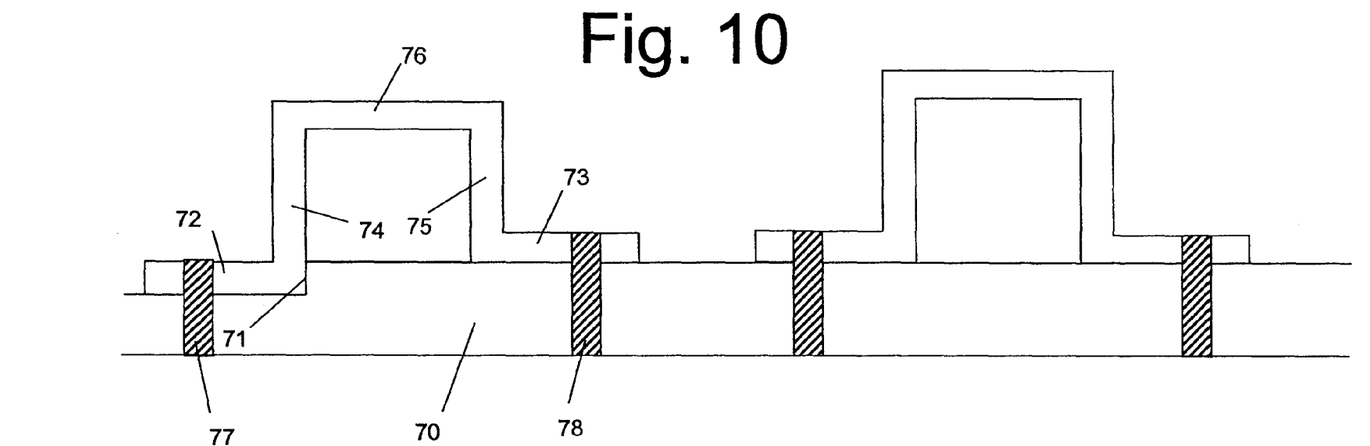
FIG. 10 is a schematic cross-section through a composite aircraft skin structure according to a sixth embodiment of the invention.

A sixth skin structure is shown in FIG. 10. A laminar composite panel 70 is formed with a step 71. A pair of "top-hat" stringers are mounted on the IML of the panel 70. The left-hand stringer straddles the step and has a pair of stiffening portions 74,75, a web 76 joining the stiffening portions 74,75, and feet 72,73 extending from the stiffening portions 73,74. The step 71 engages the stiffening portion 74 where the base of the stiffening portion 74 meets the stringer foot 72. Fasteners 77,78 pass through the stringer feet 72,73 and the panel 70. Rib feet (not shown) may be attached to the stringer webs 76 by fasteners, or may be attached to the stringer feet by the fasteners 77,78 shown in FIG. 10.

Figure 11:
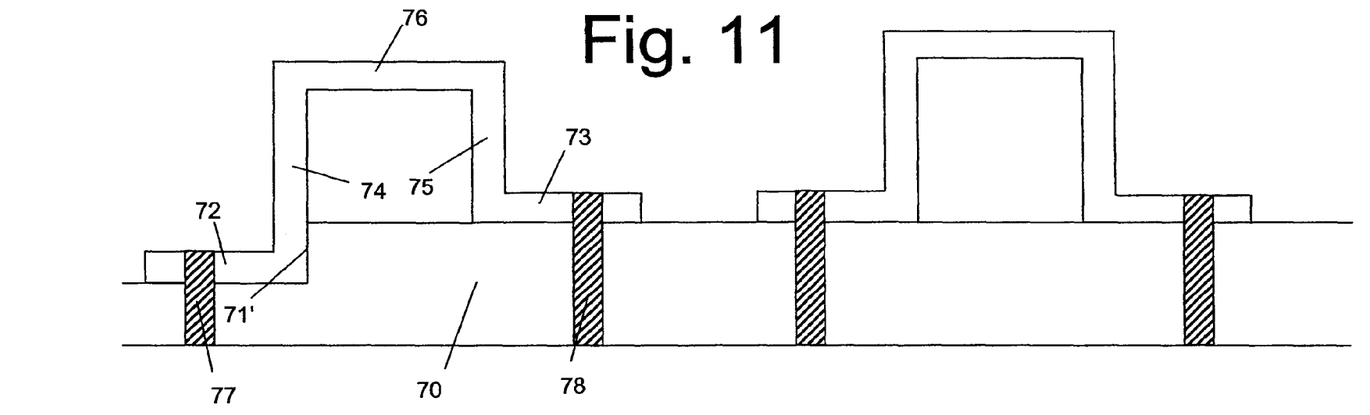
FIG. 11 is a schematic cross-section through a composite aircraft skin structure according to a seventh embodiment of the invention.

A seventh skin structure is shown in FIG. 11. This is a variant of the structure of FIG. 10 and elements are given the same reference numeral as the corresponding elements in FIG. 10. In this case the step 71' in the panel is deeper than the stringer foot 72, and is engaged by a greater length of the stiffening portion 74.

In a further variant (not shown) each stringer may be formed by a single L-shaped preform only, with the toe of the stringer foot or the base of the stringer blade engaging the step in the panel.

The advantages of the various embodiments will now be described.

The step in the panel enables a relatively large and abrupt change in skin thickness to be achieved. If the step was positioned between the stringers (that is, without engaging one of the stringers) then this would create loading eccentricity and strain concentration at the corner where the face of the step meets the thinner part of the panel. This strain concentration may result in inter-laminar shear failure at the corner. By engaging part (or all) of the step with the stringer, this problem is removed or at least reduced by transferring load through the stringer.

By forming the step in the panel with one or more discontinued plies, lay-up times for the panel are reduced for an automated tape-laying machine, compared with a conventional panel structure which uses ramps formed by discontinued internal plies. In such a conventional lay-up procedure, the head of the tape laying machine must slow down as it moves up or down a ramp. In contrast, when laying up the panels shown in FIGS. 2 to 11 the head can move across the step without slowing down.

In FIGS. 2,6 and 8-11 the IML is parallel to the OML under the stringers. This is advantageous because it makes it easier to bring together the stringer feet and the rib foot flanges during assembly. It also means that the fasteners can use conventional nuts. Furthermore, it means that the "mouse holes" 13',14' between rib feet can be relatively narrow. In contrast, FIG. 7 requires self-aligning nuts to be used, along with relatively wide mouse holes.

In FIGS. 2 and 6 the stringers are all substantially symmetrical, so are relatively easy to manufacture compared with the asymmetrical stringers shown in FIGS. 7-11.

In FIGS. 2, 6 and 7 the depth of the step is limited by the height of the toe of the stringer foot. In contrast, in FIGS. 8-11 (in which the step is engaged by a stiffening portion of the stringer) the step height may be increased further if required.

In the figures, only a pair of stringers are shown, but in general other stringers will be attached to the panel to the right and left of the stringers shown. Alternatively, if the step is formed at an edge of the panel, then the stringer (14,14' etc.) which engages the step may be the outermost stringer. In this case, the other stringers may be on the left-hand side of the stringer (that is, on the thinner side of the step)—in which case the stringer 13,13' etc. will be omitted. Alternatively the other stringers may be on the right-hand side of the stringer 14,14' etc. (that is, on the thicker side of the step).

In the figures, only a single step is shown, but in general more steps may be provided in the panel, each being engaged by a respective stringer. In particular, the right-hand stringer 13,13' etc. may engage a second step in the panel.

Although the invention has been described above with reference to one or more preferred embodiments, it will be appreciated that various changes or modifications may be made without departing from the scope of the invention as defined in the appended claims.

The invention claimed is:

1. A composite structure, comprising:
a panel formed from two or more plies of composite material, the panel having a surface formed with a step where the thickness of the panel changes; and
two or more stiffeners attached to the surface of the panel; wherein a first one of the stiffeners is attached to the surface of the panel on a thicker side of the step, and a second one of the stiffeners engages and runs substantially parallel to at least part of the step.

2. The composite structure of claim 1 further comprising a cap attached to the surface of the panel on a thicker side of the step and attached to one of the stiffeners on a thinner side of the step.

3. The composite structure of claim 2 wherein the cap is formed from one or more plies of composite material.

4. The composite structure of claim 1 wherein the second one of the stiffeners which engages at least part of the step comprises a stiffening portion which extends away from the panel, and a foot which is attached to the surface of the panel on a thinner side of the step and extends away from the stiffening portion to a toe remote from the stiffening portion, wherein the toe engages at least part of the step.

5. The composite structure of claim 1 wherein the second one of the stiffeners which engages at least part of the step comprises a stiffening portion which extends away from the panel and engages at least part of the step.

6. The composite structure of claim 1 wherein the second one of the stiffeners which engages at least part of the step comprises a first part which is attached to the surface of the panel on a thicker side of the step; and a second part which is attached to the surface of the panel on a thinner side of the step whereby the second one of the stiffeners straddles the step.

7. The composite structure of claim 1 wherein the step is formed by the edges of one or more discontinued plies in the panel, and wherein the second one of the stiffeners engages the edges of discontinued plies.

8. The composite structure of claim 1 wherein the step is formed by the edges of one or more discontinued plies, and a filler between the second one of the stiffeners and the edges of the discontinued plies, wherein the second one of the stiffeners engages the filler.

9. The composite structure of claim 1 wherein the step extends at an angle of greater than 45° to the plies in the panel adjacent to the step.

10. The composite structure of claim 1 wherein a ramp is formed in the surface of the panel between the first one of the stiffeners and the step.

11. The composite structure of claim 1 wherein a ramp is formed in the surface of the panel, and at least part of one of the stiffeners engages the ramp.

12. The composite structure of claim 1 wherein the stiffeners are each formed from two or more plies of composite material.

13. The composite structure of claim 1 further comprising fasteners passing through the stiffeners and the panel.

14. A method of manufacturing the composite structure of claim 1, the method comprising forming the panel with the step; attaching the stiffeners to the surface of the panel; and engaging at least part of the step with one of the stiffeners.

15. The method of claim 14 further comprising forming the step by discontinuing two or more plies in the panel, and machining the ends of the discontinued plies.

16. A method of transmitting load in the composite structure of claim 1, the method comprising transmitting load between the step and the stiffener.

* * * * *